(12) United States Patent
Beming et al.

(10) Patent No.: US 7,493,108 B2
(45) Date of Patent: Feb. 17, 2009

(54) PROVISION OF A MULTIMEDIA BROADCAST/MULTICAST SERVICE (MBMS) FOR A USER EQUIPMENT MOVING ALONG CELLS IN A CELLULAR MOBILE COMMUNICATION SYSTEM

(75) Inventors: Per Beming, Stockholm (SE); Elena Voltolina, Järfälla (SE); Gert-Jan Van Lieshout, Apeldoorn (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 650 days.

(21) Appl. No.: 10/541,163

(22) PCT Filed: Jan. 7, 2004

(86) PCT No.: PCT/EP2004/000050

§ 371 (c)(1),
(2), (4) Date: Jun. 30, 2005

(87) PCT Pub. No.: WO2004/071117

PCT Pub. Date: Aug. 19, 2004

(65) Prior Publication Data

US 2006/0106865 A1 May 18, 2006

(30) Foreign Application Priority Data

Jan. 8, 2003 (SE) .................................. 0300047

(51) Int. Cl.
*H04M 3/00* (2006.01)
*H04Q 7/20* (2006.01)
(52) U.S. Cl. ......................... 455/418; 445/405; 445/425
(58) Field of Classification Search .............. 455/414.1, 455/418, 405, 423, 425, 572, 428, 432.1, 455/435.2, 517, 422.1, 3.01
See application file for complete search history.

(56) References Cited

U.S. PATENT DOCUMENTS 6,996,410 B2 * 2/2006 Bos et al. ..................... 455/466

(Continued)

FOREIGN PATENT DOCUMENTS

EP       1 392 075 A1     2/2004

OTHER PUBLICATIONS

3GPP, "3rd Generation Partnership Project; Technical Specification Group Radio Access Network; Introduction of the Multimedia Broadcast Multicast Service (MBMS) in the Radio Access Network (Stage-2); (Release 6)," 3GPP TS 25.346 v1.1.0, May 2002, pp. 1-11, XP002260225, May 2002.

(Continued)

*Primary Examiner*—Sonny Trinh
(74) *Attorney, Agent, or Firm*—Potomac Patent Group PLLC

(57) ABSTRACT

Procedures are provided for the establishment of MBMS services in different cells of a cellular telecommunications network, in particular, for maintaining the transmission of MBMS data to a particular user equipment, even when it moves from one cell to another when the service is provided in different ways in different cells. In particular, when a user equipment receives a multimedia data service in a first cell via a certain type of connection (i.e., a point-to-point connection/while requiring an RRC Connection, a point-to-multipoint connection without/while requiring an RRC Connection), and moves to a second cell where the type of connection used to provide the service is different, specific actions are undertaken (e.g., request for an RRC Connection, release of an RRC Connection, etc.), depending on the type of connection change carried out. Embodiments for the establishment of the most adequate connection (p-t-p, p-t-m) in a cell are disclosed as well (e.g., by sending a message from a SRNC to a CRNC).

22 Claims, 8 Drawing Sheets

U.S. PATENT DOCUMENTS

| | | | | |
|---|---|---|---|---|
| 7,031,694 | B2* | 4/2006 | Koulakiotis et al. | 455/406 |
| 7,299,062 | B2* | 11/2007 | Yi et al. | 455/511 |
| 7,349,703 | B2* | 3/2008 | Yi et al. | 455/452.2 |
| 7,363,047 | B2* | 4/2008 | Yi et al. | 455/515 |
| 2005/0249141 | A1* | 11/2005 | Lee et al. | 370/312 |
| 2006/0034204 | A1* | 2/2006 | Lee et al. | 370/312 |
| 2006/0034225 | A1* | 2/2006 | Jung et al. | 370/331 |

OTHER PUBLICATIONS

3GPP, "3rd Generation Partnership Project; Technical Specification Group Radio Access Network; Radio Resource Control (RRC); Protocol Specification (Release 1999)," 3GPP TS 25.331 v3.12.0, Sep 2002, pp. 36-43, 98-101 and 822-829, XP002283006.

3GPP, "3rd Generation Partnership Project; Technical Specification Group Services and System Aspects; Multimedia Broadcast/Multicast Service; Architecture and Functional Description (Release 6)," 3GPP TR 23.846 2.0.0, Sep. 2002, pp. 1-114, XP002249709, May 2002.

Hutchison 3G, "RAN Solution Proposal to Support MBMS," MBMS Meeting, May 7, 2002, pp. 1-12, XP002249466.

International Search Report for PCT/EP2004/000050 dated Jul. 13, 2004.

International Preliminary Report on Patentability for PCT/EP2004/000050 dated Apr. 8, 2005.

* cited by examiner

PROVISION OF A MULTIMEDIA BROADCAST/MULTICAST SERVICE (MBMS) FOR A USER EQUIPMENT MOVING ALONG CELLS IN A CELLULAR MOBILE COMMUNICATION SYSTEM

This invention relates to Multimedia Broadcast/Multicast Services (MBMS) in mobile communication systems. More particularly, the invention relates to methods for ensuring MBMS service provision for a mobile device which is moving between cells in a cellular mobile communication system.

In the third generation telecommunication systems, higher bit-rates are offered as well as better possibilities for transmitting variable bit rate traffic. For instance, services utilizing different quality requirements are possible to multiplex. Such possibilities open up for new types of services. One of these services that will be included in the 3GPP (3rd Generation Partnership Project) standard is a Multimedia Broadcast/Multicast Service (MBMS).

The intention with MBMS is that different users can subscribe to broadcasting and/or multicasting of multimedia information of different kinds. An information provider thus transmits the same multimedia information to a number of users. Since multimedia information typically requires high transfer capabilities, a simultaneous broadcasting/multicasting of such information will occupy a number of times as large transfer capabilities compared with a single transmission. It is therefore advantageous for the network to determine whether particular MBMS data must be transmitted continuously, or whether it can be transmitted discontinuously. Further, it is advantageous for the network to determine whether particular MBMS data must be transmitted to specific users (point-to-point transmission), or whether it can more efficiently be transmitted by point-to-multipoint transmission.

The network must be able to make these determinations on a continuous basis, depending on the current locations of the users which wish to receive the particular MBMS data.

SUMMARY

According to the present invention, there are provided procedures for the establishment of MBMS services in different cells of a cellular telecommunications network. In particular, there are provided procedures for maintaining transmission of MBMS data to a particular user equipment, even as it moves from one cell to another, when the service is provided in different ways in different cells.

In addition, there is provided suitable hardware for performing the procedures according to aspects of the invention. The hardware may be in the form of user equipment, which is adapted to receive MBMS data, or radio network controllers, which are adapted to receive MBMS data and transmit it to receiving equipment, or core network equipment, which is adapted to establish the required connections to transmit data to the receiving equipment via the radio network controllers.

BRIEF DESCRIPTION OF THE DRAWINGS

The invention, together with further objects and advantages thereof, may best be understood by making reference to the following description taken together with the accompanying drawings, in which.

DETAILED DESCRIPTION OF PREFERRED EMBODIMENTS

Figure 1:
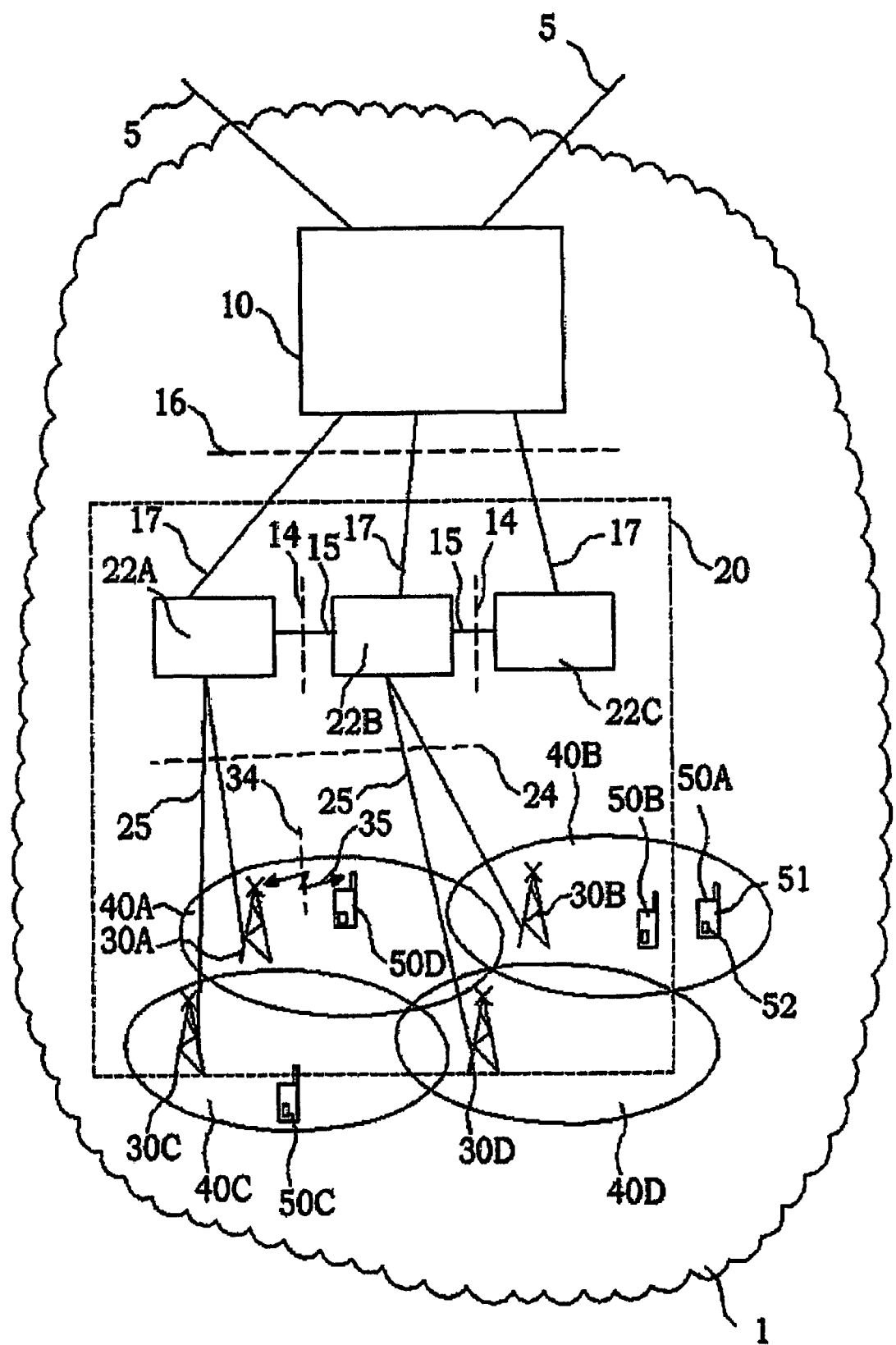
FIG. 1 is a schematic illustration of an embodiment of a mobile communication system.

The present invention comes into use mainly in the third generation mobile communication systems. A typical example of such a mobile communication system 1 is illustrated in FIG. 1. A core network 10 is provided with connections 5 to external networks (not shown), such as e.g. PSTN (Public Switched Telephone Network), ISDN (Integrated Services Digital Network) or Internet. The core network 10 is also connected 17 to a UTRAN (UMTS Radio Access Network) 20 comprising a number of Radio Network Controllers (RNCs) 22A, 22B, 22C over an Iu interface 16. In the illustrated embodiment, the three RNCs 22A, 22B, 22C are interconnected 15 by an Iur interface 14.

In the illustrated RNCs 22A, 22B are controlling two base stations 30A-D each by connections 25 over an Iub interface 24. (In the present embodiment, the RNC 22C does not directly control any base stations.) The base stations 30A-D are also commonly known as "Node Bs" in the 3GPP specifications. Each base station 30A-D operates the radio access within a certain geographical area, or cell, 40A-D. User equipment 50A-D moves within the coverage of the cells 40A-D and can communicate by radio communication 35 via a Uu interface 34 with at least one of the base stations 30A-D. The base stations 30A-D thereby comprise means for communication over the radio interface Uu 34 according to prior art within this field. Similarly, the user equipments 50A-D comprises means for communication over the radio interface Uu 34 according to prior art within this field. The details of these devices and methods are not essential for the understanding of the present invention and are furthermore easily available in standard literature. The User Equipment UE 50A-D typically comprises mobile equipment 51, e.g. a mobile phone or a portable computer, and a user SIM (Subscriber Identity Module) card 52.

Figure 2:
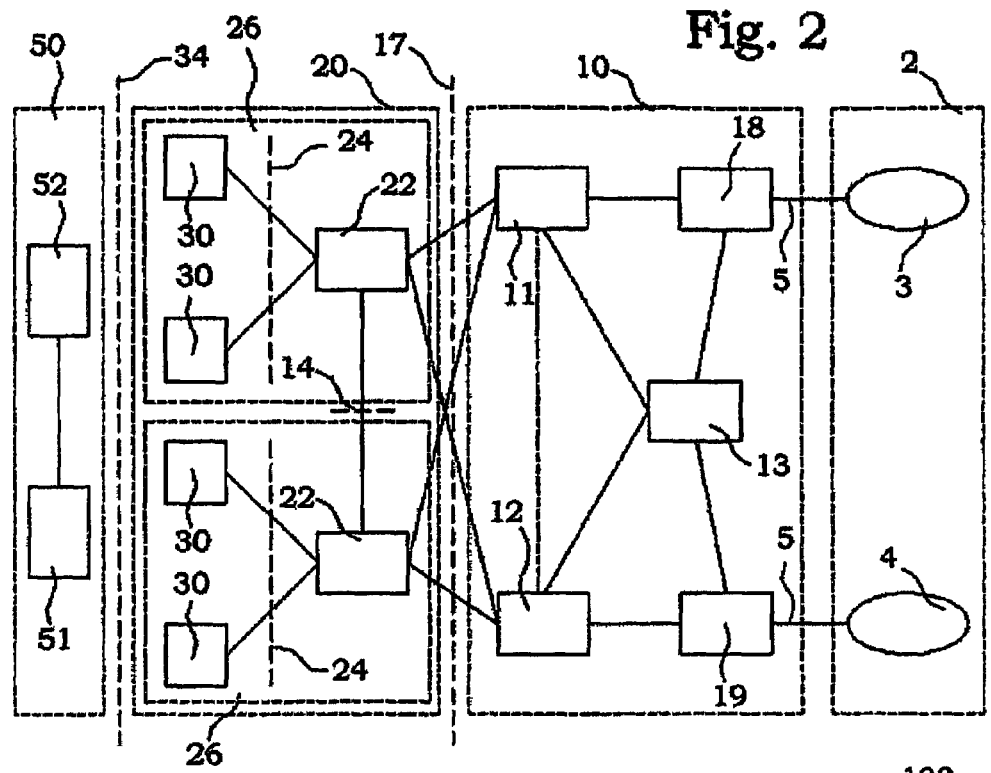
FIG. 2 is a block scheme of an embodiment of a mobile communication system.

The internal communication of a mobile communication system 1 according to FIG. 1 is easier to overview if the system 1 is illustrated in an alternative manner, as in FIG. 2. Here the four fundamental subnetworks—the external networks 2, the core network 10, the UTRAN 20 and the UE 50. The external networks 2 may comprise more traditional telephony networks based on circuit switched technology 3, such as PLMN (Public Land Mobile Network), PSTN or ISDN. The external networks 2 may also comprise packet based communication networks 4, such as the Internet.

The core network 10 comprises in this embodiment a GMSC (Gateway Mobile Switching Centre) 18, which is a switch at the point where all circuit switched connections to and from external networks pass. A MSC/VLR (Mobile Services Switching Centre/Visitor Location Register) 11, connected to the GMSC 18, is a switch and database that serves the UE for circuit switched services when the UE is within the range of a RNC 22 of the UTRAN 20 connected to the core network 10. The MSC function is used to switch the circuit switched calls. The VLR function holds track e.g. of the visiting user's service profile. The MSC/VLR 11 and the GMSC 18 are also connected to a HLR (Home Location Register) 13, which is a database located in the user's home system comprising a master copy of the user's service profile. The service profile comprises e.g. information about allowed services, supplementary service information and will in the case of MBMS also comprise information about such services. The HLR 13 stores the UE 50 location on the level of MSC/VLR and/or SGSN.

The core network 10 also comprises nodes connected to GPRS (General Packet Radio Service). A GGSN (Gateway GPRS Support Node) 19 is a switch at the point where all data packet traffic to and from external networks pass. The GGSN 19 is connected to a SGSN (Serving GPRS Support Node) 12. The functionality of the SGSN 12 is similar as for the MSC/VLR 11, but for packet switched services. The SGSN 12 and the GGSN 19 are also connected to the HLR 13. There might also be an optional interface between the MSC/VLR 11 and the SGSN 12.

The core network 10 communicates via the Iu interface 17 with the UTRAN 20. In this embodiment, the UTRAN 20 is illustrated to comprise two RNCs 22, interconnected by the Iur interface 14. Each RNC 22 has as in FIG. 1 control of Node Bs 30, which in turn communicate with the UE 50. A RNC 22 and associated Node Bs constitute together a Radio Network Subsystem (RNS) 26.

The RNC 22 is the network element responsible for the control of the radio resources of UTRAN 20. It interfaces the CN 10 and also terminates a Radio Resource Control (RRC) protocol that defines the messages and procedures between the mobile 50 and the UTRAN 20. Within the UTRAN 20, a RNC 22 can take up different roles, e.g. as a Serving RNC (SRNC), a Drift RNC (DRNC) or a Controlling RNC (CRNC).

A CRNC is always directly associated with one or more Node Bs 30. The CRNC is responsible for the load and congestion control of its own cells and executes the admission control and code allocation for new radio links to be established in those cells. The CRNC thus terminates the Iub interface 24 towards the Node B 30.

In the 3GPP standard, a UE can use resources for the UE-to-UTRAN connection from more than one RNC. The RNCs available in the UTRAN will then play different roles with respect to that particular UE. A SRNC for a particular mobile is a RNC that terminates both the Iu link for the transport of user data and the corresponding signalling to and from the core network related to radio access. The SRNC terminates further radio resource control signalling between the UE and the UTRAN. The SRNC may be a CRNC, but not necessarily. However, a specific UE has one and only one SRNC.

A DRNC is any other RNC that controls cells used by the UE. A DRNC of a UE is consequently always different from the SRNC of that specific UE. The DRNC routes data between the Iub and Iur interfaces. A certain UE may therefore have zero, one or more DRNCs.

One physical RNC normally contains all the CRNC, SRNC and DRNC functionalities. Furthermore, a SRNC associated with a certain UE may simultaneously be a DRNC for another UE.

Figure 3:
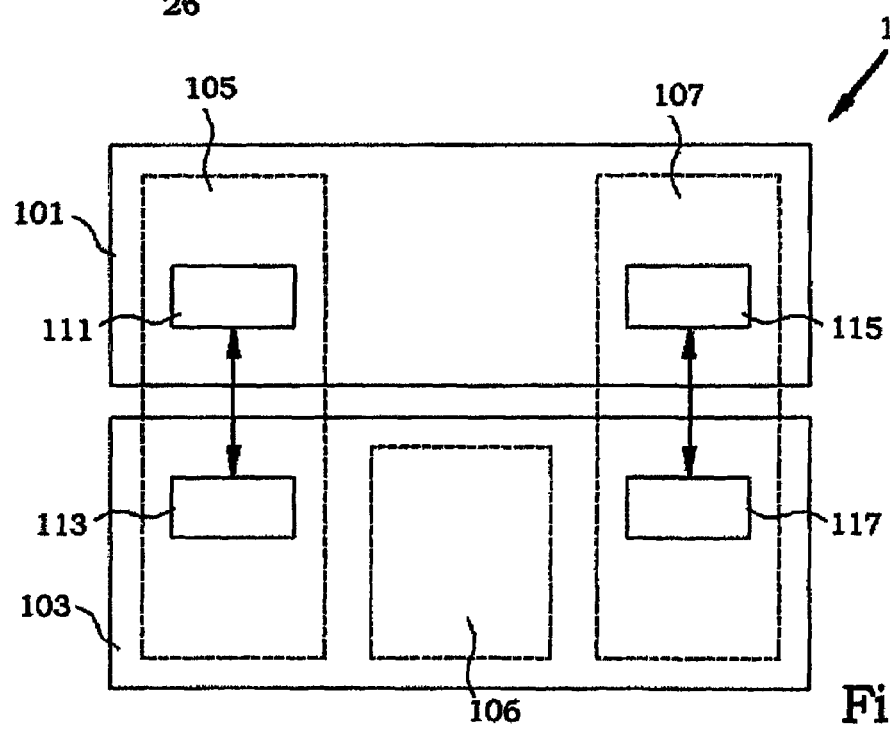
FIG. 3 is an embodiment of a protocol model for a UTRAN in a mobile communication system.

A general protocol model for UTRAN terrestrial interfaces is illustrated in FIG. 3. The protocol structure 100 consists of two main layers, a radio network layer 101 and a transport network layer 103. All UTRAN-specific issues are visible only in the radio network layer. The protocol structure 100 is also divided into vertical planes, a control plane 105 and a user plane 107. The control plane 105 and the user plane 107 are therefore present in both layers 101, 103. Furthermore, a transport network control plane 106 is additionally available in the transport network layer 103.

The control plane 105 is used for all UMTS control signalling. It includes an application protocol 111 and a signalling bearer 113 for transporting application protocol messages. The application protocol 111 is typically used for setting up bearers to the UE, e.g. radio access bearer in the Iu interface and radio links in the Iur and Iub interfaces.

The user plane 107 is instead responsible for the transmission of all actual information to the user, e.g. in the form of coded voice or general data packets. The user plane 107 includes data streams 115 and data bearers 117 for the data streams 115. Each data stream 115 is characterized by at least one protocol specified for that particular interface.

The transport network control plane 106 is used for all control signalling within the transport layer and acts therefore between the control plane 105 and the user plane 107.

The MBMS is a service offered by a content provider to subscribers of such a service that comprises synchronized broadcasting and/or multicasting of multimedia information to a number of users.

The present invention does not relate to data transfer in the core network as such. Therefore the provision of the MBMS data from a content provider to a suitable SGSN is performed according to any suitable prior-art solution and is not described more in detail. In the following description, it is therefore assumed that at least one SGSN has the requested MBMS data from the particular broadcast/multicast service center available in one way or the other, e.g. via an GGSN as an entry point. The role of the SGSN is in this context to perform user individual network control functions and to provide MBMS transmissions to the radio access network.

It is also assumed herein that, since the handling of multicast services and broadcast services is identical for the UTRAN, there is no need to differentiate between them.

The transmission of an MBMS service in the UTRAN on the Uu interface to the UE can be effected as: point-to-point (PTP) transmission; point-to-multipoint (PTM) Continuous transmission; point-to-multipoint (PTM) Discontinuous transmission; or with either PTP or PTM Discontinuous transmission available. Each of these possibilities is described in more detail below.

In the case of point-to-point (PTP) transmission, those UEs that want to receive a certain MBMS service will receive the information via point-to-point radio links.

In the Non-Access Stratum (NAS) domain, that is, transparent to the UTRAN, the UE indicates that it wants to receive a certain MBMS service. As a result, the CN establishes a normal RAB towards this specific UE which will carry the MBMS data.

Since only point-to-point transmission is used in this alternative there is no need to have the UTRAN aware that there are transmissions ongoing related to a broadcast/multicast service.

In the case of PTM Continuous transmission, Continuous PTM transmission of a certain MBMS service is configured in certain service areas (cells).

The PTM transmission is in this alternative not dependent on e.g. the user load in the cell concerned.

This alternative is most suitable for MBMS service provisioning in areas where the likelihood of a significant number of interested UEs is high.

In the case of PTM Discontinuous transmission, a certain MBMS service always uses PTM transmission. However, the PTM transmission will be turned on only if there is at least one UE in a cell interested in receiving the MBMS service. If no UE in a cell is interested in a certain MBMS service, the relevant PTM transmission will be switched off.

This avoids some of the disadvantages of PTM Continuous transmission, because there is no transmission when no UE is receiving, but it does not provide the same flexibility as the alternative described below.

In the case of the situation where PTP and PTM Discontinuous transmission are both available, a certain MBMS service will be provided based on PTP transmission if the number of UE's that wants to receive this MBMS service in a specific cell [#(MBMSx interested UE's)] is low. When, but only when, the number of receiving UE's in a certain cell exceeds a certain threshold $TR_{PTP<->PTM}$, the UTRAN will switch to PTM transmission in that cell.

This behaviour is reflected in the following expressions:

If #(MBMSx interested UE's)=0=>No MBMS transmission

If $TR_{PTP<->PTM}$>#(MBMSx interested UE's)>0=>PTP MBMS transmission

If #(MBMSx interested UE's)>$TR_{PTP<->PTM}$=>PTM MBMS transmission

PTP transmission will always provide the most radio resource efficient transmission if only one UE in a cell is interested in a certain MBMS service. Using a sensible value for $TR_{PTP<->PTM}$, this alternative will provide the most radio-resource efficient solution compared to the other alternatives listed here. $TR_{PTP<->PTM}$ is assumed to have a typical value between 2 and 5.

Given the MBMS transmission alternatives, discussed above, on the Uu interface, it is also necessary to consider the necessary MBMS Transmission Modes on the Iu interface from the Core Network to the UTRAN, and whether the Core Network needs to be aware of and/or support the selected transmission alternative.

In the preferred embodiments of the invention, point-to-multipoint transmission is realised in the Radio Access Network by using the FACH transport channel. The FACH transport channel is a common channel for which (power) control and scheduling are completely handled by the CRNC.

In the case of continuous PTM transmission, the UTRAN does not need to be aware of how many UEs are interested in a specific MBMS service in the cell. Stated differently: the UTRAN does not need to track users which want to receive a certain MBMS. That is, it does not need be aware of the cell in which such users are located. As a result, no involvement of SRNC's is required.

This is different for the cases where discontinuous transmission is possible. In these cases, the UTRAN does need to be aware of the number of UEs that want to receive a certain MBMS service in a cell, in order to switch transmissions on and off, or to switch between PTP and PTM transmission (in the case where both are available). In these alternatives, the UTRAN needs to be able to track UEs receiving a certain MBMS service.

In preferred embodiments of the present invention, where it is necessary for the UTRAN to be aware of the number of users that want to receive a specific MBMS service, the counting by the UTRAN is based on:

UE-specific RAB's established towards these UEs, and
Mobility monitoring based on RRC connection related signalling.

This approach is assumed to minimise the required impact on the user equipment and the UTRAN, while still resulting in acceptable performance.

Since it is the SRNC that handles the signalling on the Iu interface for a specific UE, and it is the SRNC that handles the RRC connection towards a specific UE, the CN therefore needs to involve SRNCs in the MBMS handling when discontinuous transmission is available. CRNCs may also be involved in this case since the PTM transmission is handled by the CRNC.

Summarising the above, the CN needs to distinguish between two modes, which can be referred to as MBMS Fixed transmission mode, and MBMS Variable transmission mode.

In MBMS Fixed transmission mode:
CN only needs to inform CRNCs of the cells corresponding to a certain service area about a certain MBMS service;
CN does not enable the UTRAN to track MBMS users;
UTRAN is only able to use point-to-multipoint (PTM) Continuous transmission.

In MBMS Variable transmission mode:
CN needs to inform the SRNC of a UE that wants to receive a specific MBMS service;
CN enables UTRAN to track MBMS users in RRC Connected Mode;
UTRAN is able to use discontinuous transmission (either point-to-multipoint, or with point-to-multipoint and point-to-point alternatives both available) for users in RRC Connected Mode;
UTRAN is unable to track MBMS users in RRC Idle Mode, but it is also able to use point-to-multipoint (PTM) Continuous transmission for such users.

Thus, if the UTRAN detects certain areas in which there are always a sufficient number of UEs to justify PTM transmission, it should be possible for the UTRAN to use point-to-multipoint (PTM) Continuous transmission in those cells. UEs should be able to detect if an RRC connection is required in a cell for receiving a specific MBMS service, and take the corresponding action.

Thus, although as mentioned above, it is assumed that the UTRAN does not need to differentiate between broadcast and multicast services, in preferred embodiments of the invention an MBMS broadcast service will only use the Fixed transmission mode so that it becomes available without requiring any RRC connection. An MBMS multicast service could use either the Fixed transmission mode or the Variable transmission mode.

Figure 4:
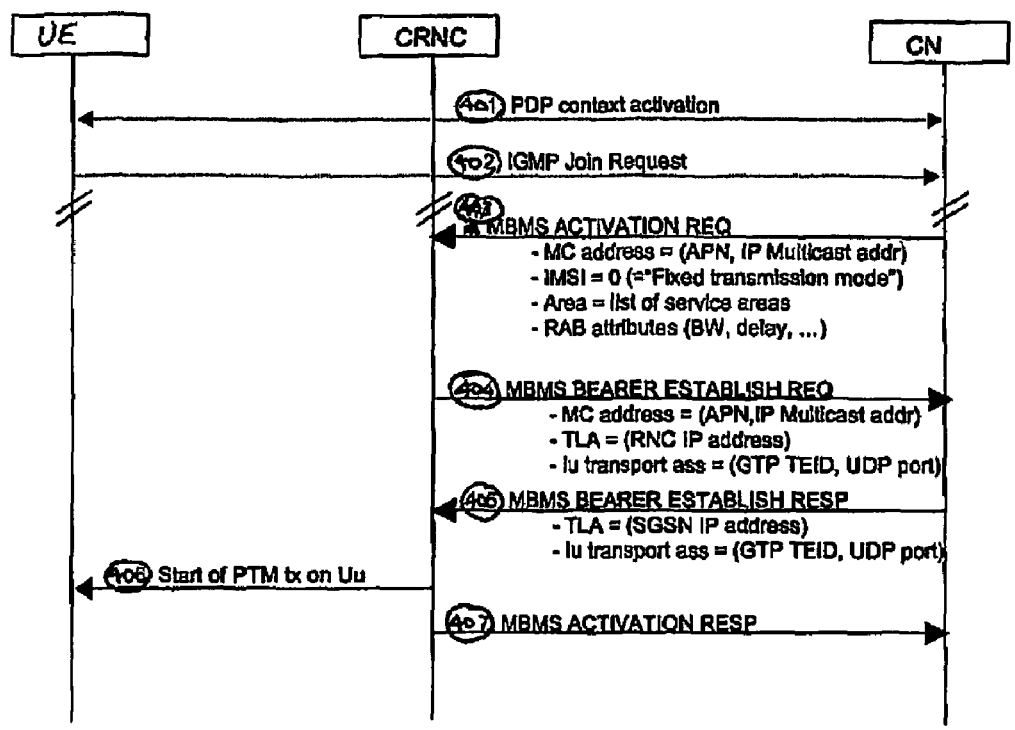
FIG. 4 shows the signalling flow in a first procedure carried out in a network according to the invention.

FIG. 4 shows the signalling in a case in which the CN requests the UTRAN to provide a transmission of a certain MBMS service in the fixed transmission mode, in a particular area.

In step 401, a PDP context is activated between the UE and the CN and, in step 402, the UE sends an Internet Group Management Protocol (IGMP) Join Request to the CN. These steps are transparent for the UTRAN. They are only required in the case of an MBMS multicast service, not in the case of an MBMS broadcast service.

In step 403, when there is data to be transmitted in the requested MBMS service, the CN will initiate the MBMS ACTIVATION REQUEST. There could be a significant period without any data transmission, and so this step could occur quite some time after specific UE's have sent an IGMP Join Request. In this illustrated embodiment of the invention, the MBMS ACTIVATION REQUEST identifies the MBMS service by the combination of the Access Point Name (APN) (that is, the DNS name of the intended Access Point, which may for example be a GGSN, including identifiers for the operator and network) and the IP multicast address. The relatively long (30-40 bytes) APN is required since different networks (or different broadcast centres) may use the same IP MC address. In other embodiments of the invention, a shorter identity may be used.

In step 404, the RNC will immediately initiate the bearer establishment procedure if it was not already receiving the data. If Iu-flex is not configured, the RNC will only be aware of one SGSN. If Iu-flex is configured, the RNC may know multiple SGSNs. In this case the RNC can send the message to any SGSN it knows. It is therefore assumed that any SGSN the RNC knows is able to provide the data for any requested MBMS service.

In step 405, the CN sends the MBMS bearer establish response to the CRNC.

In step 406, the CRNC begins transmission of point-to-multipoint transmission on the Uu interface to the interested UEs. It is assumed that the UE on its own will be able to detect the MBMS service transmission in the relevent cells. If the UE has joined the MBMS service and has received the correct keys, it will be able to receive the MBMS service without any further CN or UTRAN support.

Thus, whenever there is a PTM transmission for a certain MBMS service ongoing in a cell, a UE needs to be able to detect this transmission and receive it, whether it is in RRC Idle mode or RRC Connected Mode. Moreover, whenever there is a PTM transmission for a certain MBMS service ongoing in a cell, a UE needs to be able to determine if it is required to establish an RRC connection in order to ensure the PTM transmission, or if no RRC connection is required.

If there is no ongoing PTM transmission for a certain MBMS service, it is not required for the UE to be able to distinguish between a cell in which the MBMS service information can be provided and a cell in which the MBMS service X cannot be provided.

At least three different steps can be discerned in the MBMS related information that needs to be sent over the Uu. Firstly, the CRNC must broadcast configuration information regarding ongoing PTM MBMS data transmission. Secondly, the CRNC needs to page UEs in the event of actual data transfer. Thirdly, the CRNC needs to perform the actual MBMS data transfer.

A new MBMS System Information Block (SIB) should preferably be defined for the purpose of configuration. The MBMS SIB would contain for each MBMS service broadcast in the cell the following information:

IP MC address
Physical channel (S-CCPCH) related information
Transport channel (FACH) related information
Logical channel related information
multicast Radio Network Temporary Identifier (MC-RNTI), which temporarily identifies the group of UEs The MBMS SIB therefore configures the MBMS Radio Bearer carrying the MBMS data in the cell, when using PTM data transmission. In general, this information should not then be changed too frequently, since SIB updating requires sending notifications to all UEs.

In a UE-power-efficient solution, UEs should not be mandated to have to monitor the relevant FACH channel continuously if there is no ongoing transmission of the relevant MBMS service. This can be achieved by means of a fixed timing scheme, or by using paging.

Thus, in the case of fixed timing, every MBMS service could only be allowed to start transmission at certain frame positions. A UE receiving this MBMS service would only have to start listening at these instances. If nothing is received in the relevant radio frame, the UE can go to sleep again until the next possible scheduling occasion.

Alternatively, paging can be used to inform the UE when to listen to the FACH channel. The MBMS paging should be specific to a specific MBMS service. The current UE-specific paging can be made suitable for MBMS paging either by allocation of a RNTI per MBMS service, or by using the 12 remaining bits on the Paging Indicator channel (PICH).

The actual data transfer in step 406 is assumed to be transported over the FACH channel and uses a special MC-RNTI. One possible logical channel which could be used is a Common Traffic channel (CTCH).

Finally, in FIG. 4, step 407 shows the CRNC sending an MBMS activation response to the CN as acknowledgement.

Figure 5:
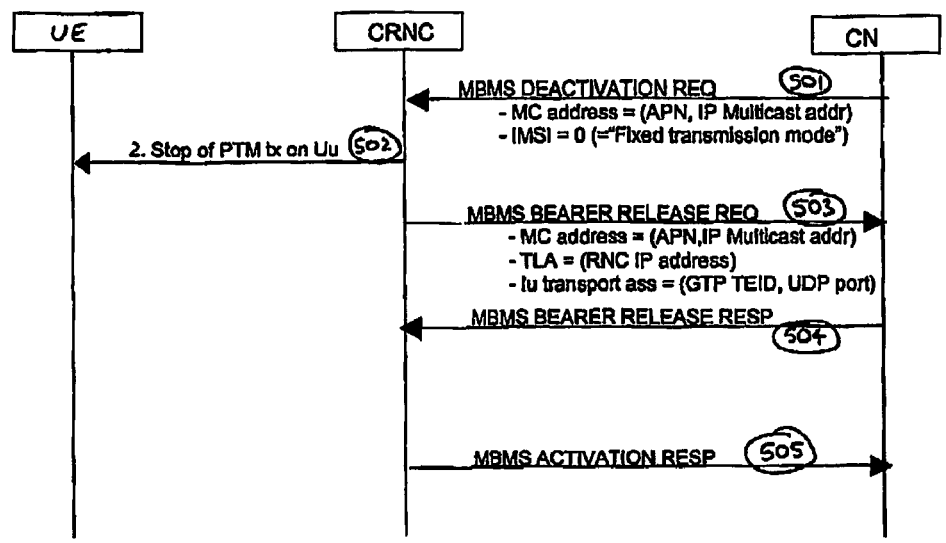
FIG. 5 shows the signalling flow in a second procedure carried out in a network according to the invention.

FIG. 5 shows an example of the de-activation scenario for the fixed transmission case.

In step 501, the CN sends a MBMS deactivation request to the CRNC, identifying the specific MBMS service by means of the MC address. The CRNC responds by stopping PTM transmission on the Uu interface, in step 502, and by sending an MBMS bearer release request to the CN in step 503. The CN replies in step 504 with an MBMS bearer release response, and the process concludes in step 505, with the CRNC sending a deactivation response to the CN as acknowledgement.

Figure 6:
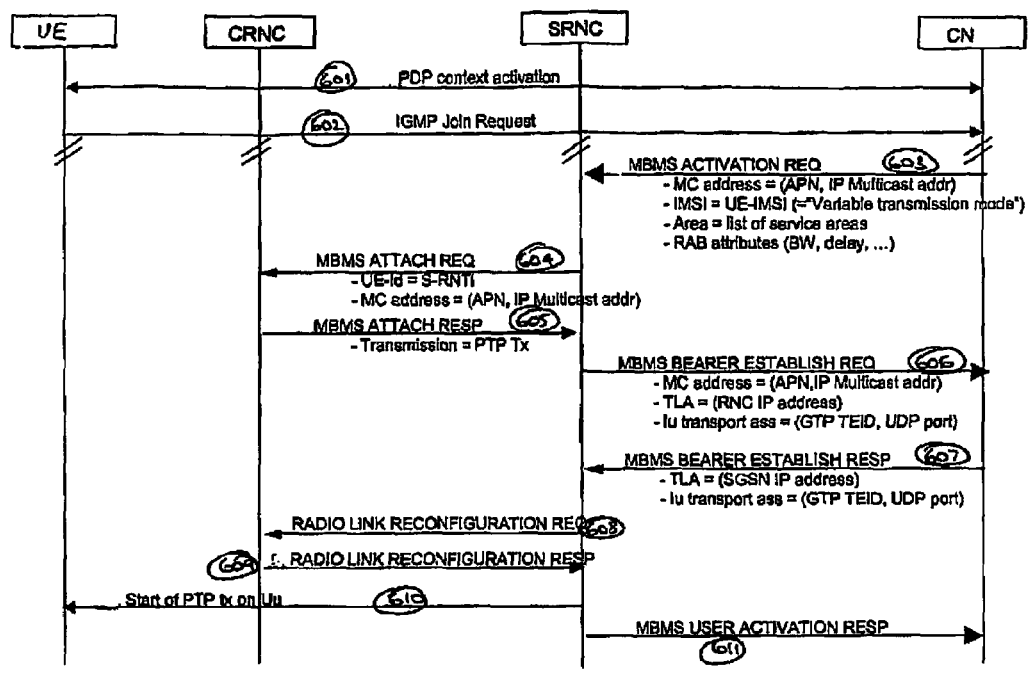
FIG. 6 shows the signalling flow in a third procedure carried out in a network according to the invention.

FIG. 6 shows the signalling flow in a case in which the CN requests the UTRAN to provide a transmission of a certain MBMS service in the variable transmission mode.

In step 601, a PDP context is activated between the UE and the CN and, in step 602, the UE sends an IGMP Join Request to the CN. The IGMP Join Request has no confirmation at IGMP level, but will be confirmed with other NAS signalling (transparent to UTRAN).

Incidentally, it is assumed that the CN will configure the service provision that a particular MBMS service may or may not be available in a particular area. This may cause difficulties when the UE performs the IGMP join in an area where the service is not provided, or when the UE performed the join in an area where the service is provided, but then passes into an area where the service is not provided. Taking the UE location into account would make the handling of the IGMP join very complicated. Therefore, in the presently preferred embodiment of the invention, the handling of the IGMP join is decoupled from the question of whether the UE is in fact in an area where it can receive the service. As a result, it is theoretically possible that the UE might perform a successful IGMP join, but still not receive the service data, and the CN should configure the service areas such that this is an unlikely case.

In step 603, when there is data to be transmitted in the requested MBMS service, the CN will send the MBMS ACTIVATION REQUEST to the relevant SRNC. There could be a significant period without any data transmission, and so this step could occur quite some time after specific UE's have sent an IGMP Join Request. In this illustrated embodiment of the invention, the MBMS ACTIVATION REQUEST identifies the MBMS service by the combination of the APN (that is, the DNS name including identifiers for the operator and network) and the IP multicast address. The relatively long (30-40 bytes) APN is required since different networks (or different broadcast centres) may use the same IP MC address. In other embodiments of the invention, a shorter identity may be used.

Before establishing the user plane over Iu, the SRNC first checks if the CRNC wants to provide the MBMS-service based on a PTM transmission. Thus, in step 604, the SRNC sends an MBMS attach request to the CRNC, identifying the requesting UE and the multicast address. In step 605, the CRNC sends a MBMS attach response to the SRNC, and, in this example, the CRNC indicates that it intends to provide PTP transmission of this MBMS service.

Assuming that the SRNC does not already provide the requested MBMS service to any UE, it triggers a bearer establishment procedure in step 606, by sending a MBMS bearer establishment request to the CN. In step 607, the CN then sends the MBMS bearer establish response to the SRNC.

The SRNC may need to reconfigure the existing radio links in order to be able to handle the additional transmission and, if so, sends a radio link reconfiguration request to the CRNC in step 608, to which the CRNC responds in step 609.

In step 610, the SRNC begins PTP transmission of the MBMS service data on the Uu interface. Then, after the transmission of the relevant MBMS service has started, in step 611, the UTRAN confirms user specific activation to the CN.

Figure 7:
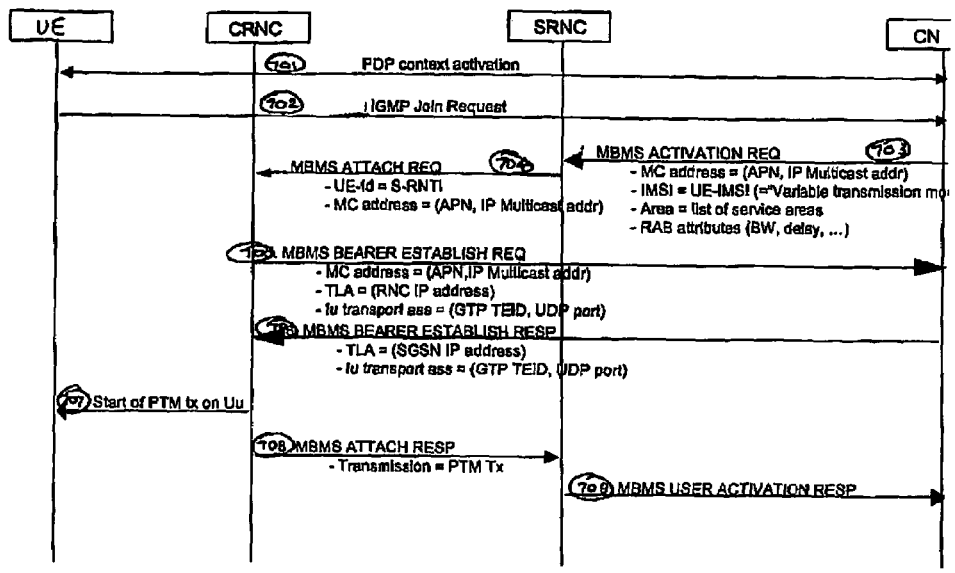
FIG. 7 shows the signalling flow in a fourth procedure carried out in a network according to the invention.

FIG. 7 shows the signalling flow in an alternative scenario in which the CN requests the UTRAN to provide a transmission of a certain MBMS service in the variable transmission mode.

In step 701, a PDP context is activated between the UE and the CN and, in step 702, the UE sends an IGMP Join Request to the CN. The IGMP Join Request has no confirmation at IGMP level, but will be confirmed with other NAS signalling (transparent to UTRAN).

In step 703, when there is data to be transmitted in the requested MBMS service, the CN will send the MBMS ACTIVATION REQUEST to the relevant SRNC. There could be a significant period without any data transmission, and so this step could occur quite some time after specific UE's have sent an IGMP Join Request. In this illustrated embodiment of the invention, the MBMS ACTIVATION REQUEST identifies the MBMS service by the combination of the APN (that is, the DNS name including identifiers for the operator and network) and the IP multicast address. The relatively long (30-40 bytes) APN is required since different networks (or different broadcast centres) may use the same IP MC address. In other embodiments of the invention, a shorter identity may be used.

Before establishing the user plane over Iu, the SRNC first checks if the CRNC wants to provide the MBMS-service based on a PTM transmission. Thus, in step 704, the SRNC sends an MBMS attach request to the CRNC, identifying the requesting UE and the multicast address.

In this illustrated example, the CRNC indicates that it intends to provide PTM transmission of this particular MBMS service, but is not yet providing the MBMS service to any UE (it will be appreciated that this is a relatively unlikely combination). Therefore, in step 705, the CRNC triggers a bearer establishment procedure. In step 706, the CN then sends the MBMS bearer establish response to the CRNC.

In step 707, the SRNC begins PTM transmission of the MBMS service data on the Uu interface. Then, after the transmission of the relevant MBMS service has started, the UTRAN confirms user specific activation to the CN, by means of a MBMS attach response from the CRNC to the SRNC in step 708 and a MBMS user activation response in step 709.

As discussed above, there will be areas (cells) in which a UE is required to have an RRC connection when receiving MBMS information (discontinuous PTP or PTM transmission) and areas where such an RRC connection is not required (continuous PTM transmission). The question then arises as to how to handle situations in the case of movement of a UE, receiving a MBMS service, between two cells, where this requirement is different for the two cells. The preferred embodiment of the present invention provides the following capabilities.

When the UE passes from a first cell with PTM transmission, where an RRC Connection is not required, to a second cell with PTM transmission, where an RRC Connection is again not required, all that is necessary is for the UE to read the new broadcast information and tune to the correct FACH. No UTRAN involvement is required.

When the UE passes from a first cell with PTM transmission, where an RRC Connection is required, to a second cell with PTM transmission, where an RRC Connection is again required, the UE is required to perform the conventional procedure for changing cells when in RRC Connected mode, and then read the MBMS broadcast information.

When the UE passes from a first cell with PTM transmission, where an RRC Connection is required, to a second cell with PTM transmission, where an RRC Connection is not required, the necessary action depends on the reason why the UE had its RRC connection established. If the RRC connection was established for another reason in addition to receiving the MBMS service, e.g. for a speech call, the RRC connection will remain as normal.

Figure 8:
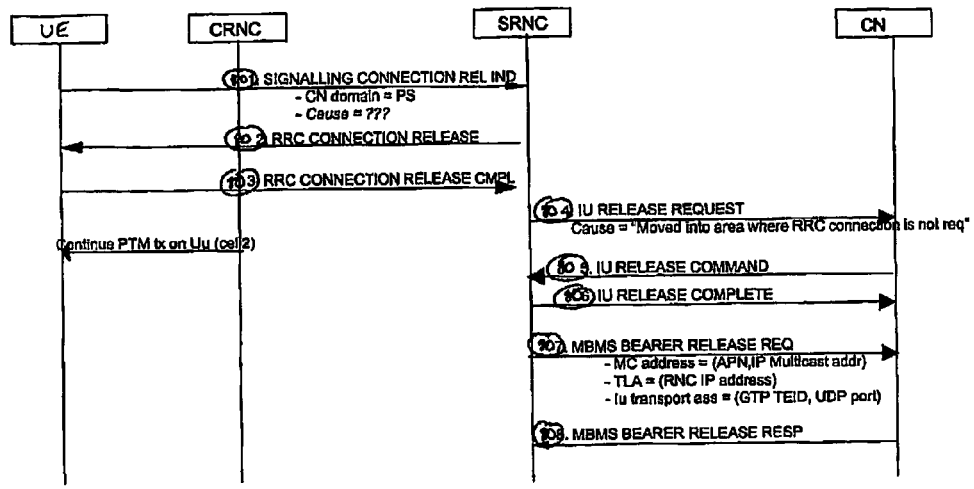
FIG. 8 shows the signalling flow in a fifth procedure carried out in a network according to the invention.

When the UE only has the RRC connection for enabling the reception of the MBMS service, no Radio Bearer (RB) will have been established towards the UE, although a Radio Access Bearer (RAB) exists. In this case, only the Signalling Radio Bearers (SRBs), used for RRC and NAS signalling, but not for data transfer, will be configured. FIG. 8 shows a signalling flow in this case.

In step 801, the UE originally has a signalling connection (as well as the RRC connection), and sends a SIGNALLING CONNECTION RELEASE INDICATION message to the SRNC. This message is already defined in the UMTS standard, for use in rare error cases (e.g. MSC restart with loss of UE context), but is also preferably used in this case. Preferably, the message includes an Information Element (IE) indicating the cause of the message.

In step 802, since the UE is moving to RRC Idle mode, the SRNC role no longer needs to be fulfilled for this UE. Therefore the Iu connection for this UE can be removed, and the SRNC sends a RRC connection release request to the UE. In step 803, the UE responds by sending a RRC connection release complete message.

The UE will be able to configure a MBMS Radio Bearer from the MBMS SIB being broadcast in the second cell. Then, in step 804, while the CRNC continues sending the PTM transmission of the MBMS data on the Uu interface to the UE, the SRNC sends an Iu release request to the CN, specifying the cause that the UE has moved into an area where an RRC connection is no longer required. As a result of this step, an SGSN might get data from a GGSN, but it does not have to deliver it to any RNC.

In step 805, the CN sends the Iu release command to the SRNC, which responds in step 806 with an Iu release complete message. In step 807, if the SRNC no longer needs the corresponding bearer, a bearer release will be requested. (Of course, the CRNC is still receiving the MBMS data for the relevant service.) The procedure completes in step 808, when the CN sends the MBMS bearer release response to the SRNC.

When the UE passes from a first cell with PTM transmission, where an RRC Connection is not required, to a second cell with PTM transmission, where an RRC Connection is required, the UE receiving the MBMS service in RRC Idle mode now detects that an RRC connection is required.

Figure 9:
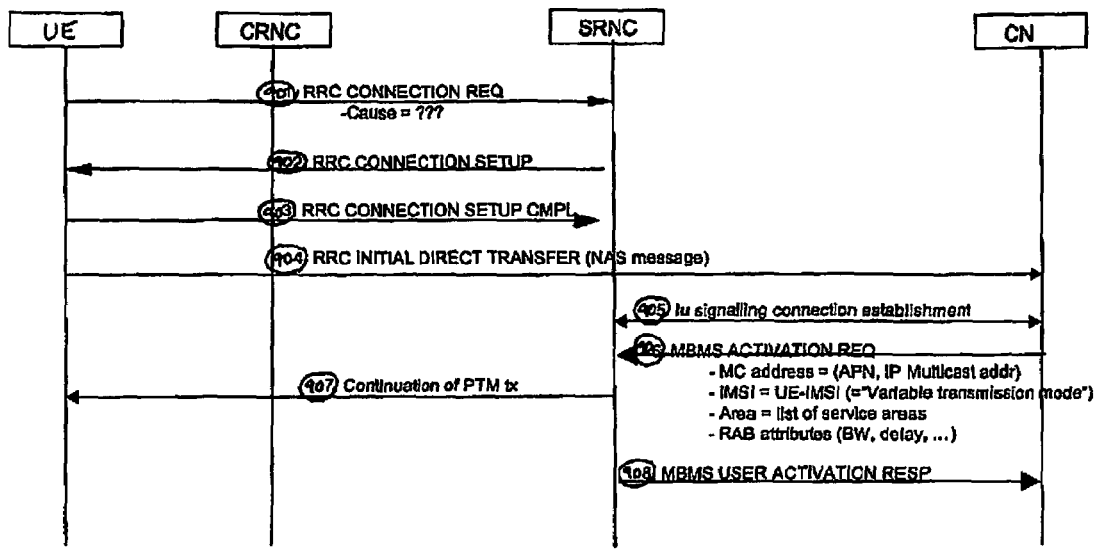
FIG. 9 shows the signalling flow in a sixth procedure carried out in a network according to the invention.

FIG. 9 shows the signalling required to establish the RRC Connection. It will be noted that FIG. 9 assumes that PTM transmission is already ongoing in the cell to which the UE is moving.

In step 901, the UE will initiate RRC Connection establishment. The message preferably includes a new cause value. In step 902, the SRNC responds with a RRC Connection setup message and, in step 903, the UE responds with a RRC Connection setup complete message.

Then, in step 904, the UE contacts the CN to trigger the UE-specific MBMS activation. In one embodiment of the invention, a normal Routing Area Update (RAU) is used for this purpose. In another embodiment of the invention, a service request is sent. In one embodiment, the NAS message indicates for each MBMS service whether or not an MBMS ACTIVATION REQ is needed. In an alternative embodiment, the CN performs an activation for all MBMS services ongoing towards this UE. In the remainder of FIG. 9, it is assumed that at least one activation is required.

In step 905, the required Iu signalling connection is required. Then, in step 906, an MBMS activation request is sent. In step 908, the SRNC sends the MBMS user activation response to the CN. Meanwhile, in step 907, the SRNC has been continuing the PTM transmission, which can now be received by the UE in the new cell.

The UE may pass from a first cell with PTP transmission, where an RRC Connection is required, to a second cell with PTM transmission, where an RRC Connection is not required.

In different embodiments of the invention, different entities may detect that the RRC connection is no longer required. Thus, in one embodiment of the invention, the SRNC detects that the RRC connection is no longer required. This is achieved by the SRNC by doing the attach to the DRNC, and the DRNC then telling the SRNC that it is already providing the service with a PTM to the UE and that no RRC connection is required. In that case, the SRNC can then inform the UE that it should start to receive the MBMS service via the PTM transmission and release the PTP RAB and possibly the RRC connection. (The SRNC can instead decide to maintain the RRC Connection, even though there is no immediate requirement for it.) This option is simpler from the point of view of the UE, but requires that the SRNC is aware of the ongoing MBMS services.

In another embodiment of the invention, the UE detects that the RRC connection is no longer required. By monitoring the MBMS SIB, the UE can then detect that the RRC connection is no longer required for this service, and triggers the release of the RRC connection. This is simpler for the UTRAN, but requires that the UE be able to monitor the MBMS SIB even in a "CELL_DCH" state. In the "CELL_DCH" state, the UTRAN (specifically the SRNC) determines which cell the UE should use. The UE has a dedicated channel, but this requires that the UE should also be able to read the common channel (that is, the BCH or FACH) on which the MBMS SIB is transmitted, in parallel with the dedicated channel, and therefore requires more complexity in the UE.

The question of detecting the status also arises in the case of a UE with a speech call moving between cells where the MBMS service is transmitted with PTM transmission. In some embodiments of the invention, the UE detects the PTM transmission; in other embodiments, the SRNC informs the UE about it.

The UE may pass from a first cell with PTP transmission, where an RRC Connection is required, to a second cell with PTM transmission, where an RRC Connection is required. Conversely, the UE may pass from a first cell with PTM transmission, where an RRC Connection is required, to a second cell with PTP transmission, where an RRC Connection is required. In either case, the change is handled by means of RRC Reconfiguration messages under control of UTRAN.

The UE may pass from a first cell with PTM transmission, where an RRC Connection is not required, to a second cell with PTP transmission, where an RRC Connection is required. This is handled in the same way as described above, when the UE passes from a first cell with PTM transmission, where an RRC Connection is not required, to a second cell with PTM transmission, where an RRC Connection is required, except that a dedicated channel is established.

Finally, the UE may pass from a first cell with PTP transmission, where an RRC Connection is required, to a second cell with PTM transmission, where an RRC Connection is again required. According to the present invention, this is handled in the UTRAN, in the same way as a conventional UE mobility procedure in CELL_DCH state, except that the DRNC additionally informs the SRNC that it does not want to provide the MBMS service on a PTM basis.

Procedures exist by which the CN can inform the UTRAN about the start or stopping of transmission for all UEs receiving this MBMS service. This signalling will exist between BMSC, GGSN and SGSN. According to preferred embodiments of the present invention, the signalling triggers a release of the user plane resource while still keeping the MBMS contexts in the network, so that an easy later continuation of the service is possible.

In some embodiments of a network in accordance with the present invention, only CRNC's are provided with MBMS functionality. They provide the MBMS service with a fixed PTM transmission (the MBMS Fixed transmission mode described above). In addition, MBMS services with an expected low number of interested UEs can be handled with PTP transmission. This has the advantage that it has limited impact on the UTRAN, and specifically means that the SRNC does not need to be MBMS aware. PTM is available for MBMS services with expected high number of receiving UEs, while PTP is available for MBMS services with expected low number of receiving UEs, and there is support for reception in RRC idle mode in PTM areas. However, each MBMS service is provided either always on a PTP basis or always on a PTM basis, requiring the CN to estimate the expected average number of receiving UEs.

In other embodiments of a network in accordance with the present invention, all UTRAN RNC's are upgraded to become MBMS aware, and MBMS services are provided based on PTM, but the transmission can be turned on or off based on the number of receiving UEs. This has the advantage that there is no unnecessary PTM transmission if no interested UE is present, while there is support for reception in RRC idle mode in PTM areas with continuous PTM transmission. However, all UTRAN RNCs (SRNCs and CRNCs) need to become MBMS aware, and only PTM is supported.

In other embodiments of a network in accordance with the present invention, all UTRAN RNC's are upgraded to become MBMS aware, and MBMS services can be provided based on PTP or on continuous PTM transmission in configured areas. This has the advantage that an MBMS service can be provided either by PTP or by PTM in one cell, based on the expected number of UEs in that cell, and that there is support for reception in RRC idle mode in PTM areas. However, all UTRAN RNCs (SRNCs and CRNCs) need to become MBMS aware, and there is no switching between PTP and PTM in one cell.

However, in the most preferred embodiments a network in accordance with the present invention, all UTRAN RNC's are upgraded to become MBMS aware, and all of the transmission alternatives discussed above are possible. This has the advantage that it provides the best solution from the point of view of radio efficiency, and supports reception in RRC idle mode in PTM areas with continuous PTM transmission. However, it is the most complex solution.

Based on the above, it should be clear that, when the CN wants to provide a certain MBMS service, it has to configure the UTRAN with information regarding the service areas in which this MBMS service should be provided with a fixed transmission mode, and in which service areas the MBMS service can be provided with a variable transmission mode. This configuration phase of the UTRAN for a specific MBMS service will be UE independent.

It will be understood by those skilled in the art that various modifications and changes may be made to the present invention without departure from the scope thereof, which is defined by the appended claims.

The invention claimed is:

1. A method of providing a multimedia data service, for user equipment which is capable of movement amongst a plurality of cells served by respective base stations of a radio access network, comprising:
   providing the multimedia data service to each of said cells (a) on a point-to-multipoint basis without requiring a Radio Resource Control connection, (b) on a point-to-multipoint basis while requiring a Radio Resource Control connection, or (c) on a point-to-point basis; and
   controlling at least one Radio Network Controller such that, when a user equipment moves from a first cell to a second cell, it is detected whether a Radio Resource Control connection is required in the second cell, and a suitable connection is established in said second cell to allow said user equipment to receive the multimedia data service, wherein at least one of the first and second cells provides the multimedia data service on a point-to-multipoint basis without requiring a Radio Resource Control connection.

2. A method as claimed in claim 1, wherein, when the user equipment moves from a first cell in which the multimedia data service is provided on a point-to-multipoint basis while requiring a Radio Resource Control connection, to a second cell in which the multimedia data service is provided on a point-to-multipoint basis without requiring a Radio Resource Control connection, the method comprises:
   sending a SIGNALLING CONNECTION RELEASE INDICATION message from the user equipment to the serving Radio Network Controller.

3. A method as claimed in claim 2, wherein the SIGNALLING CONNECTION RELEASE INDICATION message indicates the movement of the user equipment into said second cell as the cause of the request.

4. A method as claimed in claim 1, wherein, when the user equipment moves from a first cell in which the multimedia data service is provided on a point-to-multipoint basis while requiring a Radio Resource Control connection, to a second cell in which the multimedia data service is provided on a point-to-multipoint basis without requiring a Radio Resource Control connection, the method comprises:
   releasing the Radio Resource Control connection of said user equipment, such that said user equipment no longer requires a serving Radio Network Controller;
   continuing point-to-multipoint transmission of the multimedia data service data from a controlling Radio Network Controller for said user equipment; and
   releasing an Iu interface between a previous serving Radio Network Controller and said controlling Radio Network Controller for said user equipment.

5. A method as claimed in claim 4, further comprising:
   determining whether said previous serving Radio Network Controller still requires a bearer connection to receive said multimedia data service data; and
   if not, releasing said bearer connection.

6. A method as claimed in claim 1, wherein, when the user equipment moves from a first cell in which the multimedia data service is provided on a point-to-multipoint basis without requiring a Radio Resource Control connection, to a second cell in which the multimedia data service is provided on a point-to-multipoint basis while requiring a Radio Resource Control connection or on a point-to-point basis while requiring a Radio Resource Control connection, the method comprises:
   sending a request for a Radio Resource Control connection from the user equipment to the serving Radio Network Controller.

7. A method as claimed in claim 6, wherein the request for a Radio Resource Control connection indicates the movement of the user equipment into said second cell as the cause of the request.

8. A method as claimed in claim 1, wherein, when the user equipment moves from a first cell in which the multimedia data service is provided on a point-to-multipoint basis without requiring a Radio Resource Control connection, to a second cell in which the multimedia data service is provided on a point-to-multipoint basis while requiring a Radio Resource Control connection or on a point-to-point basis while requiring a Radio Resource Control connection, the method comprises:
   establishing a Radio Resource Control connection for said user equipment; and
   said user equipment directly contacting a core network to trigger activation of the multimedia data service for said user equipment.

9. A method as claimed in claim 8, wherein said user equipment contacts said core network by means of a Routing Area Update message.

10. A method as claimed in claim 9, wherein, when the multimedia data service in the second cell is provided on a point-to-point basis while requiring a Radio Resource Control connection, further comprising a dedicated channel for transmission of said multimedia data service data to said user equipment.

11. A method as claimed in claim 1, wherein, when the user equipment moves from a first cell in which the multimedia data service is provided on a point to-multipoint basis without requiring a Radio Resource Control connection, to a second cell in which the multimedia data service is provided on a point to-multipoint basis while requiring a Radio Resource Control connection or on a point-to-point basis while requiting a Radio Resource Control connection, the method comprises:
   establishing a Radio Resource Control connection for said user equipment, such that said user equipment requires a serving Radio Network Controller;
   said user equipment directly contacting a core network to trigger activation of the multimedia data service for said user equipment; and
   establishing an Iur interface between a serving Radio Network Controller and a controlling Radio Network Controller for said user equipment.

12. A method as claimed in claim 11, wherein, when the multimedia data service in the second cell is provided on a paint-to-multipoint basis while requiring a Radio Resource Control connection, the method further comprising:
 establishing a bearer connection from the core network to said serving Radio Network Controller for multimedia data service data; and
 transmitting the multimedia data service data on a point-to-multipoint basis from said serving Radio Network Controller.

13. A method as claimed in claim 11, wherein, when the multimedia data service in the second cell is provided on a point-to-point basis while requiring a Radio Resource Control connection, the method further comprising:
 establishing a bearer connection from the core network to said serving Radio Network Controller for multimedia data service data; and
 establishing a dedicated channel for transmitting the multimedia data service data on a point-to-point basis from said serving Radio Network Controller to said user equipment.

14. A method as claimed in claim 1, wherein, when the user equipment moves from a first cell in which the multimedia data service is provided on a point-to-point basis while requiring a Radio Resource Control connection, to a second cell in which the multimedia data service is provided on a point-to-multipoint basis without requiring a Radio Resource Control connection, the method comprises:
 detecting in a serving Radio Network Controller that the Radio Resource Control connection is no longer required.

15. A method as claimed in claim 14, wherein the step of detecting in the serving Radio Network Controller that the Radio Resource Control connection is no longer required comprises:
 performing an attach from the serving Radio Network Controller to a drift Radio Network Controller; and
 said drift Radio Network Controller informing said serving Radio Network Controller that it is already providing the multimedia data service without requiring a Radio Resource Control connection.

16. A method as claimed in claim 14, wherein the serving Radio Network Controller informs the user equipment that it should receive the multimedia data service data on a point-to-multipoint basis.

17. A method as claimed in claim 14, wherein the serving Radio Network Controller informs the user equipment that it should release its existing radio access bearer for the receipt of the multimedia data service data on a point-to-point basis.

18. A method as claimed in claim 14, wherein the serving Radio Network Controller informs the user equipment that it should release its existing Radio Resource Control connection.

19. A method as claimed in claim 1, wherein, when the user equipment moves from a first cell in which the multimedia data service is provided on a point-to-point basis while requiring a Radio Resource Control connection, to a second cell in which the multimedia data service is provided on a point-to-multipoint basis without requiring a Radio Resource Control connection, the method comprises:
 detecting in the user equipment that the Radio Resource Control connection is no longer required.

20. A method as claimed in claim 19, wherein the step of detecting in the user equipment that the Radio Resource Control connection is no longer required comprises monitoring a multimedia data service System Information Block (SIB).

21. A method as claimed in claim 19, further comprising releasing the existing Radio Resource Control connection.

22. A method as claimed in claim 1, wherein, when the user equipment moves from a first cell in which the multimedia data service is provided on a point-to-multipoint basis without requiring a Radio Resource Control connection, to a second cell in which the multimedia data service is also provided on a point-to-multipoint basis without requiring a Radio Resource Control connection, the method comprises:
 the user equipment reading the broadcast information relating to the multimedia data service and tuning to a channel on which the data is being transmitted.

* * * * *